US012638426B2

(12) United States Patent
Bae et al.

(10) Patent No.: US 12,638,426 B2
(45) Date of Patent: May 26, 2026

(54) INTERFACE BETWEEN LIQUID CHROMATOGRAPHY, IONIZATION DEVICE, AND MASS SPECTROMETER, AND SAMPLE ANALYSIS METHOD USING THE SAME

(71) Applicant: LG Chem, Ltd., Seoul (KR)

(72) Inventors: Yongjin Bae, Daejeon (KR); Hyun Sik You, Daejeon (KR); Bomee Jang, Daejeon (KR); Young Hee Lim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 394 days.

(21) Appl. No.: 18/036,476

(22) PCT Filed: Jul. 20, 2022

(86) PCT No.: PCT/KR2022/010577
§ 371 (c)(1),
(2) Date: May 11, 2023

(87) PCT Pub. No.: WO2023/003335
PCT Pub. Date: Jan. 26, 2023

(65) Prior Publication Data
US 2023/0400439 A1 Dec. 14, 2023

(30) Foreign Application Priority Data

Jul. 20, 2021 (KR) ......................... 10-2021-0094815
Jul. 19, 2022 (KR) ......................... 10-2022-0088759

(51) Int. Cl.
*G01N 30/72* (2006.01)
*H01J 49/04* (2006.01)
(Continued)

(52) U.S. Cl.
CPC .......... *G01N 30/724* (2013.01); *H01J 49/049* (2013.01); *H01J 49/14* (2013.01); *H01J 49/0031* (2013.01)

(58) Field of Classification Search
CPC ...... H01J 49/0466; H01J 49/049; H01J 49/14; H01J 49/0031; G01N 30/724; G01N 30/7233
See application file for complete search history.

(56) References Cited

U.S. PATENT DOCUMENTS 4,982,097 A * 1/1991 Slivon ................. H01J 49/0404
250/281
4,996,424 A * 2/1991 Mimura .............. H01J 49/0431
250/281
(Continued)

FOREIGN PATENT DOCUMENTS

CN 104966657 A 10/2015
CN 105021718 A 11/2015
(Continued)

OTHER PUBLICATIONS

Zhou, Feng, et al. "Thermal-assisted gasification injector for analyzing high-salt solution samples: a novel device developed for online coupling of liquid chromatography with direct analysis in real time mass spectrometry." RSC Advances 6.101 (2016): 98927-98934.*

(Continued)

*Primary Examiner* — Wyatt A Stoffa
(74) *Attorney, Agent, or Firm* — Lerner David LLP

(57) ABSTRACT
An interface and a sample analysis method using the same are disclosed herein. In some embodiments, an interface is between a liquid chromatography (LC), an ionization device, and a mass spectrometer (MS), wherein a sample containing a target eluted from the liquid chromatography is ionized by the ionization device and the sample is intro-
(Continued)

duced into the mass spectrometer, wherein the interface includes a droplet sprayer, an evaporator having a heatable block, and an introduction tube, wherein the heatable block has one or more openings, the droplet sprayer for converting the sample into sample droplets and for spraying the sample droplets, the evaporator for evaporating a solvent in the sample droplets to generate a gaseous target by passing the droplets through the one or more openings, the introduction tube for receiving the gaseous target and for introducing an ionized gaseous target into the mass spectrometer.

11 Claims, 7 Drawing Sheets

(51) Int. Cl.
H01J 49/14 (2006.01)
H01J 49/00 (2006.01)

(56) References Cited

U.S. PATENT DOCUMENTS

| | | | |
|---|---|---|---|
| 5,162,650 A | 11/1992 | Bier | |
| 5,266,192 A * | 11/1993 | Ligon | H01J 49/0445 |
| | | | 250/288 |
| 5,859,432 A * | 1/1999 | Kato | G01N 30/7273 |
| | | | 250/288 |
| 5,986,259 A | 11/1999 | Hirabayashi et al. | |
| 6,121,608 A | 9/2000 | Takada et al. | |
| 6,236,042 B1 * | 5/2001 | Kato | G01N 30/7246 |
| | | | 250/281 |
| 6,252,225 B1 | 6/2001 | Takada et al. | |
| 6,437,327 B2 | 8/2002 | Takada et al. | |
| 7,470,899 B2 * | 12/2008 | Atherton | H01J 49/0404 |
| | | | 250/288 |
| 10,991,560 B2 * | 4/2021 | Brown | H01J 49/0431 |
| 2001/0022344 A1 * | 9/2001 | Takada | G01N 30/7266 |
| | | | 250/288 |
| 2005/0148066 A1 * | 7/2005 | O'Keefe | B01F 33/30351 |
| | | | 422/403 |
| 2008/0142698 A1 * | 6/2008 | Atherton | H01J 49/0404 |
| | | | 250/288 |
| 2014/0131570 A1 | 5/2014 | Yoshioka et al. | |
| 2015/0380226 A1 | 12/2015 | Fukui et al. | |
| 2016/0372313 A1 * | 12/2016 | Brown | H01J 49/0431 |
| 2019/0111808 A1 | 4/2019 | Castelli | |
| 2019/0112004 A1 | 4/2019 | Civiero | |
| 2019/0112812 A1 | 4/2019 | Ferri et al. | |
| 2019/0113123 A1 | 4/2019 | Civiero | |
| 2020/0225251 A1 | 7/2020 | Collins et al. | |
| 2020/0300822 A1 | 9/2020 | Cappiello et al. | |
| 2020/0318575 A1 | 10/2020 | Schiariti et al. | |
| 2020/0331047 A1 | 10/2020 | Galli et al. | |
| 2021/0022589 A1 | 1/2021 | Crotti | |
| 2021/0187141 A1 | 6/2021 | Crotti | |
| 2021/0190014 A1 | 6/2021 | Schiariti et al. | |
| 2021/0212796 A1 | 7/2021 | Crotti | |
| 2021/0330723 A1 | 10/2021 | Del Bono et al. | |
| 2022/0233617 A1 | 7/2022 | Del Bono et al. | |
| 2024/0085286 A1 * | 3/2024 | Blagojevic | G01N 1/02 |
| 2025/0204591 A1 * | 6/2025 | Biel | A24F 40/44 |

FOREIGN PATENT DOCUMENTS

| | | | |
|---|---|---|---|
| CN | 105845540 A | 8/2016 | |
| JP | S62055863 U | 4/1987 | |
| JP | H06331616 A | 12/1994 | |
| JP | H08145950 A | 6/1996 | |
| JP | H09119915 A | 5/1997 | |
| JP | 2000162188 A | 6/2000 | |
| JP | 2002184346 A | 6/2002 | |
| JP | 2016011847 A | 1/2016 | |
| JP | 2020526751 A | 8/2020 | |
| KR | 20050010246 A | 1/2005 | |
| KR | 20200071103 A | 6/2020 | |

OTHER PUBLICATIONS

Extended European Search Report including Written Opinion for Application No. 22846205.7 dated Apr. 17, 2024, pp. 1-12.

Watanabe, J., "Lipid Analysis by Direct Ionization Mass Spectrometry DART-MS", Japan Oil Chemists' Society, vol. 19, No. 2, 2019, pp. 51-58. [Providing English Translation of Abstract only].

Sisco, E. et al: "Rapid analysis of trace drugs and metabolites using a thermal desorption DART-MS configuration", Analytical Methods, [Online] vol. 8, No. 35, Aug. 16, 2016 (Aug. 16, 2016), pp. 6494-6499, XP93141495, GB ISSN: 1759-9660, DOI: 10.1039/C6AY01851C Retrieved from the Internet: URL:http://xlink.rsc.org/?DOI=C6AY01851C> [retrieved on Mar. 14, 2024].

Kloth, R. et al., "Implementation of an enclosed ionization interface for the analysis of liquid sample streams with direct analysis in real time mass spectrometry," Rapid Communications in Mass Spectrometry, Mar. 30, 2021, vol. 35, No. 13, Article No. e9091, pp. 1-11.

Zhou, F. et al., "Thermal-assisted gasification injector for analyzing high-salt solution samples: a novel device developed for online coupling of liquid chromatography with direct analysis in real time mass spectrometry," RCS Advances, Oct. 2016, vol. 6, Issue 101, pp. 98927-98934 (Accepted Manuscript version, pp. 1-24).

International Search Report for PCT/KR2022/010577 mailed Nov. 1, 2022. 5 pages.

Kloth R, et al. Implementation of an enclosed ionization interface for the analysis of liquid sample streams with direct analysis in real time mass spectrometry. Rapid Communications in Mass Spectrometry. Jul. 15, 2021;35(13):e9091. 11 pgs.

* cited by examiner

【Figure 1】
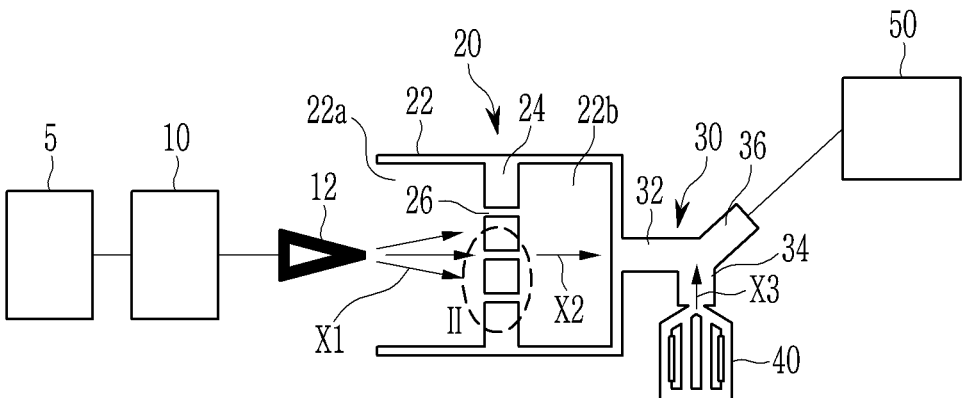

【Figure 2】
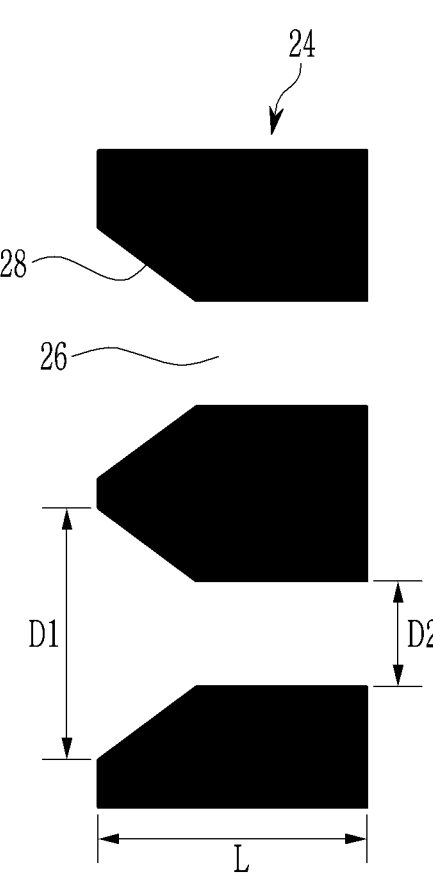

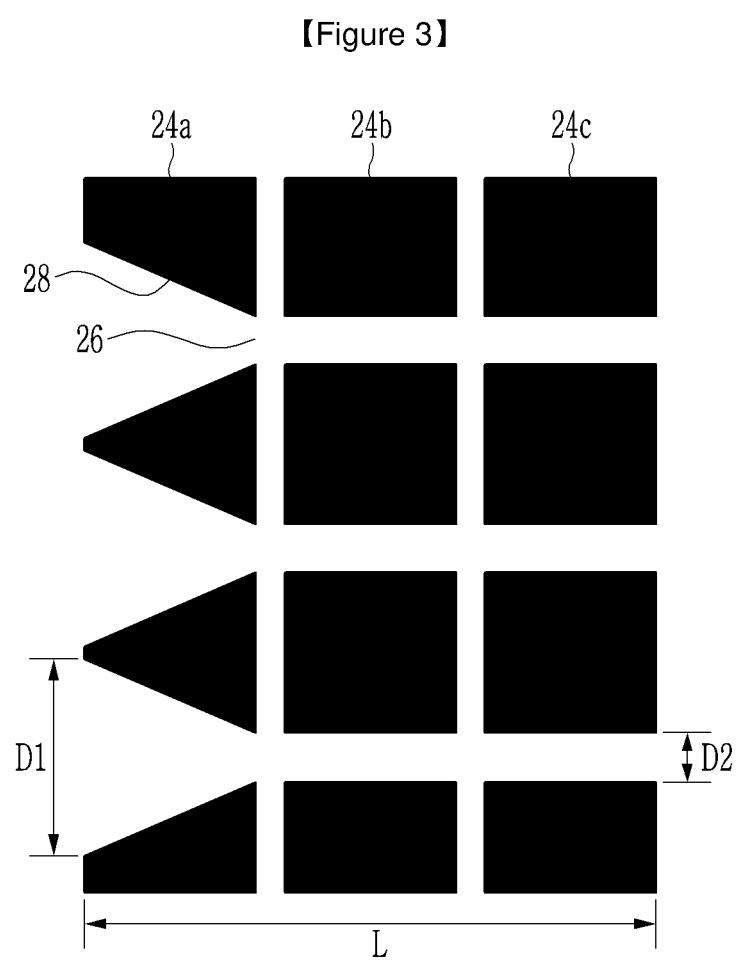

【Figure 3】

【Figure 4】
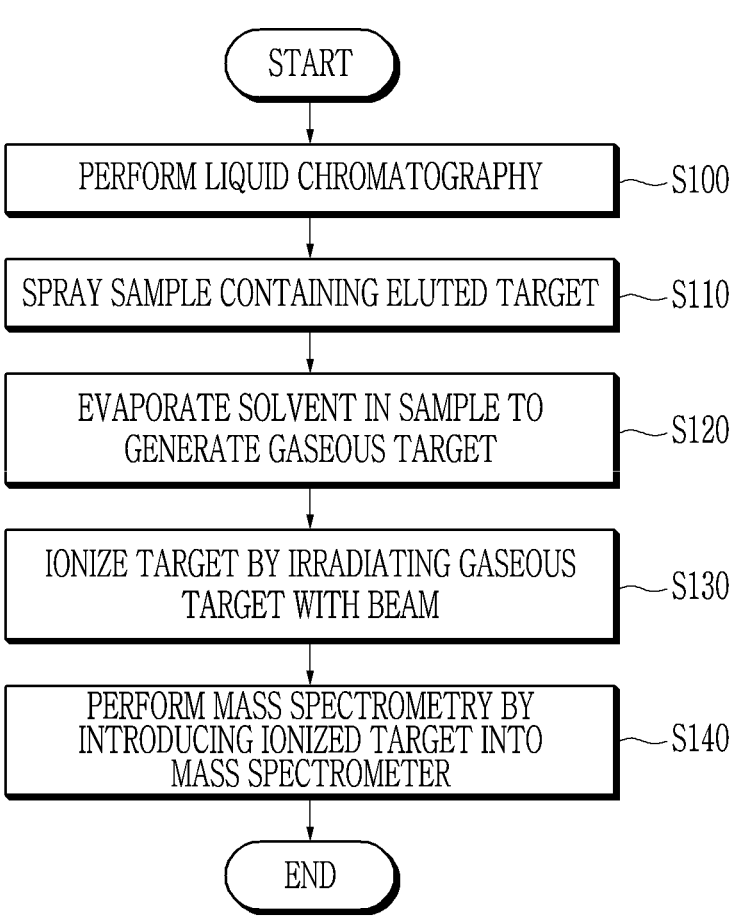
START
PERFORM LIQUID CHROMATOGRAPHY — S100
SPRAY SAMPLE CONTAINING ELUTED TARGET — S110
EVAPORATE SOLVENT IN SAMPLE TO GENERATE GASEOUS TARGET — S120
IONIZE TARGET BY IRRADIATING GASEOUS TARGET WITH BEAM — S130
PERFORM MASS SPECTROMETRY BY INTRODUCING IONIZED TARGET INTO MASS SPECTROMETER — S140
END
【Figure 5】
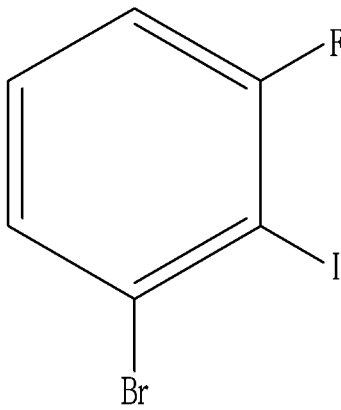

【Figure 6】
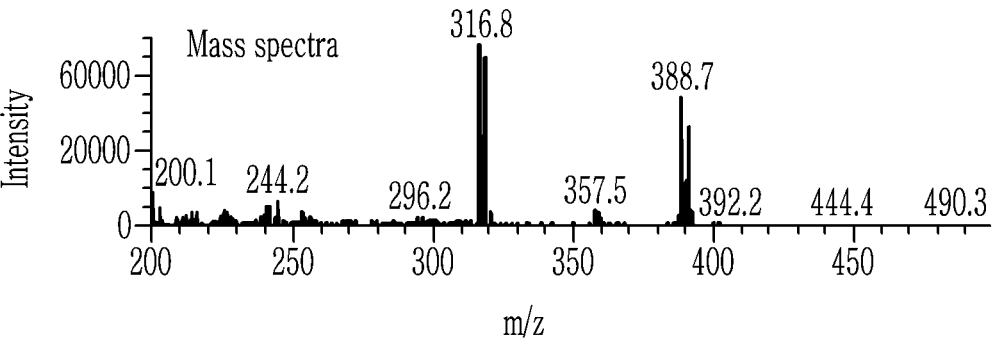
【Figure 7】
【Figure 8】

【Figure 9】
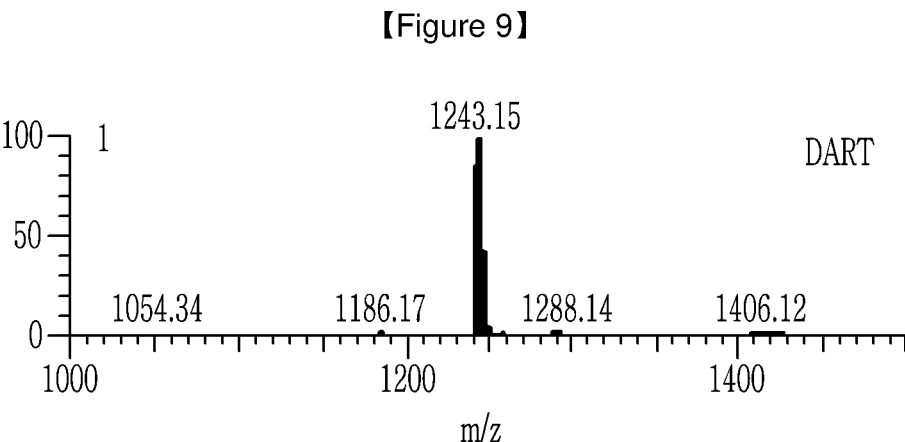
【Figure 10】
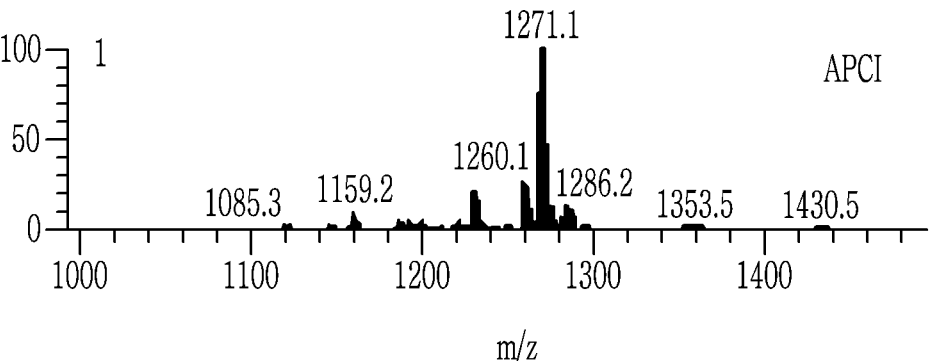
【Figure 11】
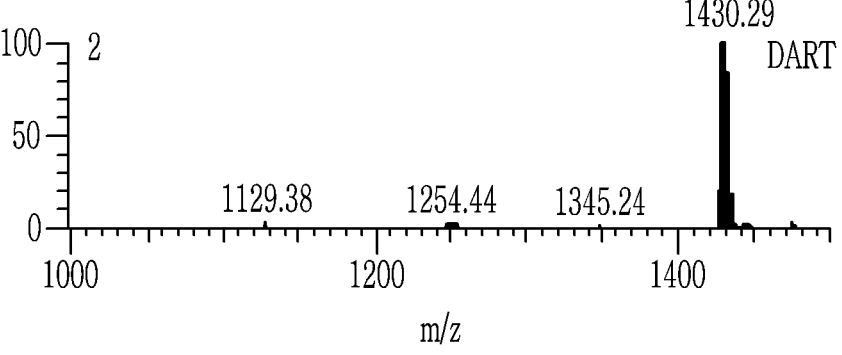

【Figure 12】
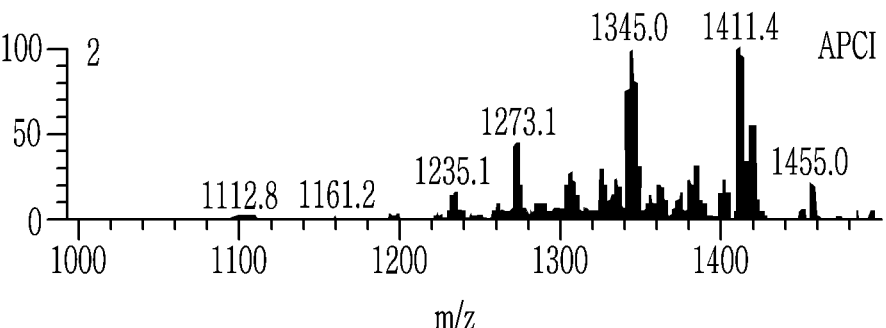

INTERFACE BETWEEN LIQUID CHROMATOGRAPHY, IONIZATION DEVICE, AND MASS SPECTROMETER, AND SAMPLE ANALYSIS METHOD USING THE SAME

CROSS-REFERENCE TO RELATED APPLICATION(S)

This application is a national phase entry under 35 U.S.C. § 371 of International Application No. PCT/KR2022/010577, filed on Jul. 20, 2022, which claims priority from Korean Patent Application No. 10-2021-0094815, filed on Jul. 20, 2021, and Korean Patent Application No. 10-2022-0088759, filed on Jul. 19, 2022, the entire contents of which are incorporated by reference herein.

TECHNICAL FIELD

The present disclosure relates to an interface between a liquid chromatography, an ionization device, and a mass spectrometer, and a sample analysis method using the same, and more particularly, to an interface between a liquid chromatography, an ionization device, and a mass spectrometer that may efficiently detect a non-polar low-molecular-weight material and a silicon-based compound, and a sample analysis method using the same.

BACKGROUND

A liquid chromatography/mass spectrometer (LC/MS) is mainly used for quantitative analysis and qualitative analysis of materials. In the liquid chromatography/mass spectrometer (LC/MS), an outlet of the liquid chromatography is connected to an inlet of the mass spectrometer, such that a sample containing a target separated into a single component in the liquid chromatography may be supplied to the mass spectrometer, and a component of the target may be detected in the mass spectrometer.

The mass spectrometer separates ions generated by ionizing a target to be analyzed according to a ratio of a mass to a charge amount and displays the target in the form of a mass spectrum. Therefore, in the liquid chromatography/mass spectrometer (LC/MS), an ionization device that ionizes the target is disposed between the liquid chromatography and the mass spectrometer.

Examples of an ionization method widely used in the liquid chromatography/mass spectrometer (LC/MS) include an electrospray ionization (ESI) method and an atmospheric pressure chemical ionization (APCI) method. Such an ionization method is widely used in the liquid chromatography/mass spectrometer (LC/MS) because it may effectively perform not only a role of ionizing a target (analyte) but also a role of an interface between the liquid chromatography and the mass spectrometer. However, in a case where the target is a non-polar low-molecular-weight material or a silicon-based compound, it may be difficult to analyze the target by such an ionization method.

Direct analysis in real time (DART) is one of the methods capable of effectively ionizing these materials (for example, the non-polar low-molecular-weight material, the silicon-based compound, and the like). In order to apply the direct analysis in real time (DART) to the liquid chromatography/mass spectrometer (LC/MS), a solvent contained in a sample eluted from the liquid chromatography should be rapidly volatilized to make the target a gas phase. Therefore, the development of an efficient interface for applying DART to LC/MS is required.

The above information disclosed in this Background section is only for enhancement of understanding of the background of the disclosure, and therefore it may contain information that does not form the prior art that is already known in this country to a person of ordinary skill in the art.

Technical Problem

An exemplary embodiment of the present disclosure has been made in an effort to provide an interface between a liquid chromatography, an ionization device, and a mass spectrometer having advantages of applying direct analysis in real time to a liquid chromatography/mass spectrometer.

Another exemplary embodiment of the present disclosure has been made in an effort to provide a sample analysis method using the interface according to an exemplary embodiment of the present disclosure.

Technical Solution

An exemplary embodiment of the present disclosure provides an interface between a liquid chromatography (LC), an ionization device, and a mass spectrometer (MS). A sample containing a target eluted from the liquid chromatography is ionized by the ionization device and the sample is introduced into the mass spectrometer. The interface may include: a droplet sprayer, an evaporator having a heatable block, where the heatable block has one or more openings, and an introduction tube, where the droplet sprayer is for converting the sample containing the target eluted from the liquid chromatography into sample droplets and for spraying the sample droplets into the evaporator, wherein the evaporator is for evaporating a solvent contained in the sample droplets to generate a gaseous target by passing the sample droplets through the one or more openings, wherein the introduction tube is for receiving the gaseous target from the evaporator and for introducing an ionized gaseous target into the mass spectrometer, and wherein the ionization device may ionize the gaseous target passing through the introduction tube by irradiating the gaseous target in the introduction tube with a beam to form the ionized gaseous target.

One end (a first end) of each of the one or more openings facing the droplet sprayer may have an inclined surface, wherein a diameter of the first end decreases along a direction of flow of the sample droplets.

A diameter or a length of each of the one or more openings may be adjustable.

The block may include a plurality of pieces, and the plurality of pieces may be combined with each other to form the one or more openings.

The evaporator may further include a housing, and the block may be detachably mounted in the housing so as to intersect with a flow of the sample droplets.

A diameter of the first end of the opening may be 1 mm to 20 mm, a diameter of the other end (a second end) of the opening may be 0.1 mm to 5 mm, and a length of the opening along the direction of flow of the sample droplets may be 0.5 mm to 100 mm.

The block may be capable of being heated to a set temperature, and the set temperature may be 50° C. to 500° C.

The ionization device may be direct analysis in real time (DART) that radiates a helium beam.

The droplet sprayer may be an electric sprayer or a gas sprayer.

Another exemplary embodiment of the present disclosure provides a sample analysis method including: separating a mixture into a single component by performing liquid chromatography by a liquid chromatography and eluting the single component as a sample containing a target and a solvent; converting the sample containing the target eluted from the liquid chromatography into sample droplets and spraying the sample droplets by a droplet sprayer into an evaporator; evaporating the solvent in the sample droplets in the evaporator to generate a gaseous target; ionizing the gaseous target by irradiating the gaseous target with a beam produced by an ionization device to form an ionized target; and performing mass spectrometry of the ionized target using a mass spectrometer.

The evaporator may include a housing, and a block that is detachably mounted in the housing so as to intersect with a flow of the sample droplets and is heatable to a set temperature.

The block may include one or more openings, the sprayed sample droplets may be converted to the gaseous target while passing through the one or more openings.

One end (a first end) of each of the one or more openings facing the droplet sprayer may have an inclined surface, wherein a diameter of the first end decreases along the incline surface in a direction of flow of the sample droplets.

The ionization device may be DART that irradiates the gaseous target flowing toward the mass spectrometer through the introduction tube with a helium beam.

The sample analysis method may further include adjusting a diameter or a length of the opening or the set temperature of the block according to a target.

A diameter of the first end of the opening may be 1 mm to 20 mm, a diameter of the second end of the opening may be 0.1 mm to 5 mm, a length of the opening along the direction of flow of the sample droplets may be 0.5 mm to 100 mm, and the set temperature may be 50° C. to 500° C.

Advantageous Effects

According to an exemplary embodiment of the present disclosure, the direct analysis in real time is applied to the liquid chromatography/mass spectrometer, such that it is possible to effectively detect a non-polar low-molecular-weight material, a silicon-based compound, and the like that are difficult to be detected with LC/MS using another ionization method according to the related art.

In addition, various samples may be effectively analyzed by adjusting the diameter and the length of the opening formed in the block according to the composition and spray conditions of the sample droplets containing the target to be analyzed.

In addition, the effects that may be obtained or predicted from the exemplary embodiments of the present disclosure will be directly or implicitly disclosed in the detailed description of the exemplary embodiments of the present disclosure. That is, various effects predicted according to the exemplary embodiment of the present disclosure will be disclosed in the detailed description to be described below.

BRIEF DESCRIPTION OF THE DRAWINGS

Exemplary embodiments herein may be better understood with reference to the following description in conjunction with the accompanying drawings in which similar reference numerals indicate the same or functionally similar elements.

FIG. 1 is a schematic view of a liquid chromatography/mass spectrometer according to an exemplary embodiment of the present disclosure.

FIG. 2 is a schematic cross-sectional view illustrating a block according to an example.

FIG. 3 is a schematic cross-sectional view illustrating a block according to another example.

FIG. 4 is a flowchart of a sample analysis method according to another exemplary embodiment of the present disclosure.

FIG. 5 is a view illustrating a molecular structure of a material according to Example 1.

FIG. 6 is a mass spectrum of the material according to Example 1 by the liquid chromatography/mass spectrometer according to an exemplary embodiment of the present disclosure.

FIG. 7 is a view illustrating a molecular structure of a material according to Example 2.

FIG. 8 is a view illustrating a molecular structure of a material according to Example 3.

FIG. 9 is a mass spectrum of the material according to Example 2 by the liquid chromatography/mass spectrometer according to an exemplary embodiment of the present disclosure.

FIG. 10 is a mass spectrum of the material according to Example 2 by a liquid chromatography/mass spectrometer according to the related art.

FIG. 11 is a mass spectrum of the material according to Example 3 by the liquid chromatography/mass spectrometer according to an exemplary embodiment of the present disclosure.

FIG. 12 is a mass spectrum of the material according to Example 3 by the liquid chromatography/mass spectrometer according to the related art.

It should be understood that the drawings referenced above are not necessarily illustrated to scale, and present rather simplified expressions of various preferable features illustrating the basic principles of the present disclosure. The specific design features of the present disclosure including, for example, specific dimensions, directions, locations, and shapes will be partially determined by the specific intended application and environment of use.

DETAILED DESCRIPTION

The terms used herein are intended to describe only specific exemplary embodiments and are not intended to limit the present disclosure. As used herein, the singular forms are intended to include the plural forms, unless the context clearly indicates otherwise. The term "comprise" and/or "comprising" specifies the presence of recited features, integers, steps, operations, elements, and/or components when used herein, but will be understood that the presence or addition of one or more of other features, integers, steps, operations, elements, components, and/or groups thereof are not excluded. As used herein, the term "and/or" includes any one or all combinations of the associated and listed items.

Herein, the term "target" or a term similar thereto refers to a target to be analyzed using a liquid chromatography/mass spectrometer.

Herein, the term "sample" or a term similar thereto refers to a sample eluted from a liquid chromatography, and the sample contains a solvent and a target.

An interface between a liquid chromatography (LC), an ionization device, and a mass spectrometer (MS) according to an exemplary embodiment of the present disclosure is disposed between the liquid chromatography and the mass spectrometer, and rapidly evaporates a target contained in a sample eluted from the liquid chromatography into a gas phase to assist in ionization of the gaseous target by a beam radiated from the ionization device. Therefore, according to an exemplary embodiment of the present disclosure, it is possible to provide an interface that may efficiently detect a non-polar low-molecular-weight material, a silicon-based compound, and the like, and is suitable for applying direct analysis in real time (DART) to LC/MS. In addition, a sample analysis method according to another exemplary embodiment of the present disclosure includes: rapidly evaporating a target contained in a sample eluted from a liquid chromatography into a gas phase using the interface according to an exemplary embodiment of the present disclosure; ionizing the target by irradiating the gaseous target with a beam by DART; and introducing the ionized target into a mass spectrometer.

Hereinafter, exemplary embodiments of the present disclosure will be described in detail with reference to the accompanying drawings.

FIG. 1 is a schematic view of a liquid chromatography/mass spectrometer according to an exemplary embodiment of the present disclosure.

As illustrated in FIG. 1, the liquid chromatography/mass spectrometer according to an exemplary embodiment of the present disclosure includes a liquid chromatography 5, a droplet sprayer 10, an evaporator 20, an introduction tube 30, an ionization device 40, and a mass spectrometer 50. Here, the droplet sprayer 10, the evaporator 20, and the introduction tube 30 constitute an interface according to an exemplary embodiment of the present disclosure.

The liquid chromatography 5 separates a mixture into a single component by using the fact that passage rates of components contained in the mixture are different depending on affinity with a mobile phase and a stationary phase of a liquid phase. That is, the liquid chromatography 5 elutes the single component as a sample containing a target and a solvent. The type of the liquid chromatography 5 is not limited, and various types of liquid chromatography 5 known to those skilled in the art may be used.

The droplet sprayer 10 is disposed downstream of the liquid chromatography 5 and is connected to the liquid chromatography 5. The droplet sprayer 10 sprays the sample containing the target and solvent in the form of droplets to the evaporator 20. That is, the droplet sprayer 10 sprays sample droplets X1 to the evaporator 20. To this end, the droplet sprayer 10 includes a probe 12 and sprays the sample droplets X1 through the probe 12. The type of the droplet sprayer 10 is not limited, and may be an electric sprayer or a gas sprayer as an example. A solvent contained in the sample may be easily evaporated in the evaporator 20 because the droplet sprayer 10 sprays the sample in the form of the sample droplets X1. In addition, sheath gas may be additionally used to effectively evaporate the solvent. Usable sheath gas may be, but is not limited to, nitrogen, air, or the like.

The evaporator 20 is disposed downstream of the droplet sprayer 10, receives the sample droplets X1 sprayed through the probe 12, and evaporates the solvent in the sample droplets X1 to generate a gaseous target X2 including the target. The evaporator 20 includes a housing 22 and a block 24.

The housing 22 has a hollow shape, at least a portion of one surface thereof is opened, and the probe 12 sprays the sample droplets X1 into the housing 22 through the opened one surface.

The block 24 is disposed inside the housing 22 to cross the housing 22 and divide the housing 22 into two portions. The probe 12 sprays the sample droplets X1 to a first portion 22a of the housing 22, and the introduction tube 30 is connected to a second portion 22b of the housing 22. The block 24 may be detachably mounted in the housing 22 so as to interest with a flow direction of the sample droplets X1, one or more openings 26 may be formed in the block 24, and the block 24 may be heated to a set temperature by a heating means (not illustrated) installed inside or outside the block 24. Therefore, the sample droplets X1 sprayed to the first portion 22a of the housing 22 are smeared on a surface (including the opening 26) of the block 24 or pass through the opening 26 to be heated and evaporated, and the evaporated gaseous target X2 passes through the opening 26 and moves to the second portion 22b of the housing 22. The gaseous target X2 moved to the second portion 22b of the housing 22 is supplied to the mass spectrometer 50 through the introduction tube 30.

Hereinafter, the block 24 will be described in more detail with reference to FIGS. 2 and 3.

FIG. 2 is a schematic cross-sectional view illustrating a block according to an example, and FIG. 3 is a schematic cross-sectional view illustrating a block according to another example.

As illustrated in FIG. 2, the block 24 according to an example is integrally formed in one piece. One or more openings 26 are formed in the block 24. One end (a first end) of each opening 26 facing the probe 12 may have an inclined surface 28 where a diameter of the first end decreases along the incline surface in a direction of flow of the sample droplets X1, and the remaining portion of the opening 26 excluding the inclined surface 28 may have a constant diameter. That is, a diameter of each opening 26 may be gradually decreased from one side to the other side along the flow of the sample droplets X1 to form the inclined surface 28, and the remaining portion of each opening 26 may have a diameter constant on the other side of the inclined surface 28. The inclined surface 28 is formed at the one end of the opening 26 facing the probe 12, such that a surface area of the one end of the opening 26 is increased, and therefore, the probability that the sample droplets X1 sprayed from the probe 12 enter the opening 26. Therefore, more sample droplets X1 enter the opening 26 and then are heated, such that the sample droplets X1 may be rapidly and effectively evaporated.

In an example, a diameter D1 of the one end of the opening 26 may be 1 mm to 20 mm. When the diameter D1 of the one end of the opening 26 is smaller than 1 mm, a sufficient amount of the sample droplets X1 do not enter the opening 26, and when the diameter D1 of the one end of the opening 26 is larger than 20 mm, the sample droplets X1 entering the opening 26 may not be evaporated by the block 24.

A diameter D2 of the other end (a second end) of the opening 26 may be 0.1 mm to 5 mm. The diameter D2 of the other end of the opening 26 acts as a resistance for inhibiting a flow of the gaseous target X2. When the diameter D2 of the other end of the opening 26 is smaller than 0.1 mm, the resistance is too large and a flow rate of the gaseous target X2 is thus decreased, and when the diameter D2 of the other end of the opening 26 is larger than 5 mm, the resistance is too small and the flow rate of the gaseous target X2 is thus excessively increased. When the flow rate of the gaseous target X2 is high, turbulence may occur and an overlap with the beam radiated from the ionization device 40 may be decreased, resulting in low detection sensitivity. Therefore, the diameter D2 of the other end of the opening 26 is set to 0.1 mm to 5 mm, such that the gaseous target may be brought into a state suitable for ionization of the target by the irradiation with the beam in the ionization device 40.

A length L of the opening 26 along the flow of the sample droplets X1 may be 0.5 mm to 100 mm. Similar to the diameter D2 of the other end of the opening 26, the length L of the opening 26 along the flow of the sample droplets X1 acts as a resistance for inhibiting the flow of the gaseous target X2. When the length L of the opening 26 along the flow of the sample droplets X1 is smaller than 0.5 mm, the flow rate of the gaseous target X2 may be increased, resulting in occurrence of turbulence or low detection sensitivity, and when the length L of the opening 26 along the flow of the sample droplets X1 is larger than 100 mm, the flow rate of the gaseous target X2 may be decreased, resulting in low detection sensitivity.

The set temperature of the block 24 may be 50° C. to 500° C. When the temperature of the block 24 is lower than 50° C., the sample may not be evaporated, and when the temperature of the block 24 is higher than 500° C., a molecular structure of the target may be broken.

The state of the target supplied to the mass spectrometer 50 varies depending on the diameter D1 of the one end of the opening 26, the diameter D2 of the other end of the opening 26, the length L of the opening 26 along the flow of the sample droplets X1, and the temperature of the block 24. Since the state of the target required in the mass spectrometer 50 varies depending on the type of the target, various types of targets may be analyzed with one mass spectrometer 50 by adjusting the diameter D1 of the one end of the opening 26, the diameter D2 of the other end of the opening 26, the length L of the opening 26 along the flow of the sample droplets X1, and the temperature of the block 24.

As illustrated in FIG. 3, a block 24 according to another example includes a plurality of pieces 24a, 24b, and 24c, and the plurality of pieces 24a, 24b, and 24c are combined with each other to form one block 24. The first, second, and third pieces 24a, 24b, and 24c include elements constituting one or more openings 26, and when the first, second, and third pieces 24a, 24b, and 24c are combined with each other, the elements are also combined with each other to form a complete opening 26. For example, the first piece 24a has an inclined surface 28 of the opening 26, and the second and third pieces 24b and 24c include a portion having a constant diameter of the opening 26. Therefore, when the first, second, and third pieces 24a, 24b, and 24c are combined with each other, one or more complete openings 26 are formed.

The block 24 according to another example allows a length L of the opening 26 to be easily adjusted according to the type of the target. That is, when a plurality of pieces 24a, 24b, and 24c having different specifications (for example, an inclined surface, a diameter, a length, and the like) are provided, required pieces may be assembled and used according to the type of the target. Therefore, there is no need to manufacture a plurality of blocks 24 according to the type of the target.

Referring to FIG. 1 again, the introduction tube 30 is disposed downstream of the evaporator 20 and connects the evaporator 20, the ionization device 40, and the mass spectrometer 50 to each other. The introduction tube 30 includes first, second, and third conduits 32, 34, and 36.

The first conduit 32 has both ends, and one end is connected to the evaporator 20, that is, the second portion 22b of the housing 22, such that the gaseous target X2 evaporated by the block 24 is introduced into the introduction tube 30 through the first conduit 32.

The second conduit 34 has both ends, one end is connected to the ionization device 40, and the other end is connected to the other end of the first conduit 32. Therefore, a beam X3 (for example, a helium beam) generated in the ionization device 40 is radiated to the gaseous target X2 flowing through the first and third conduits 32 and 36 to ionize the target. A means for preventing the inflow of the gaseous target X2 and irradiating the gaseous target X2 with the beam X3 may be mounted at the other end of the second conduit 34.

The third conduit 36 has both ends, one end is connected to the other ends of the first and second conduits 32 and 34, and the other end is connected to the mass spectrometer 50. The gaseous target X2 introduced into the introduction tube 30 through the first conduit 32 is irradiated with the beam to be ionized while passing through a junction of the first, second, and third conduits 32, 34, and 36, and then, the gaseous target X2 is supplied to the mass spectrometer 50 through the third conduit 36.

The ionization device 40 generates the beam X3 and irradiates, with the beam X3, the gaseous target X2 flowing through the first and third conduits 32 and 36 through the second conduit 34. Therefore, at least the target included in the gaseous target X2 is ionized. In an example, the ionization device 40 may be DART, and the beam X3 generated in the ionization device 40 may be a helium beam. By using DART as the ionization device 40, a non-polar low-molecular-weight material, a silicon-based compound, or the like that is difficult to be ionized with another ionization method may be ionized. Since the ionization device 40, in particular, DART, is well known to those skilled in the art, a further detailed description thereof will be omitted.

The mass spectrometer 50 is connected to the other end of the third conduit 36 to receive and analyze a sample containing an ionized target. Therefore, the mass spectrometer 50 may output a mass spectrum of the target. Since the mass spectrometer 50 is well known to those skilled in the art, a further detailed description thereof will be omitted.

Hereinafter, the sample analysis method using the liquid chromatography/mass spectrometer according to an exemplary embodiment of the present disclosure will be described in detail with reference to FIG. 4.

FIG. 4 is a flowchart of a sample analysis method according to another exemplary embodiment of the present disclosure.

As illustrated in FIG. 4, in S100, a mixture is separated into a single component and the single component is eluted as a sample containing a target by performing liquid chromatography by the liquid chromatography 5.

The sample separated and eluted by the liquid chromatography 5 is converted into the form of the sample droplets X1 by the droplet sprayer 10, and is sprayed to the evaporator 20 in the form of the sample droplets X1 through the probe 12 (S110). Here, the droplet sprayer 10 may be an electric sprayer or a gas sprayer. In addition, sheath gas may be additionally used.

The sample droplets X1 sprayed to the evaporator 20 is evaporated while passing through one or more openings 26 in the block 24 heated to the set temperature to be the gaseous target X2 (S120). As described above, the inclined surface 28 is formed at one end of each opening 26 facing the droplet sprayer 10, such that a maximum amount of sample droplets X1 sprayed from the droplet sprayer 10 may enter the opening 26. Meanwhile, prior to the analysis of the target, the block 24 having appropriate specifications (the diameter D1 of the one end of the opening 26, the diameter D2 of the other end of the opening 26, the length L of the opening 26 along the flow of the sample droplets X1, the temperature of the block 24, and the like) according to the type of the target may be mounted in the housing 22.

The gaseous target X2 evaporated by the block 24 is introduced into the first conduit 32 of the introduction tube 30 and moves toward the mass spectrometer 50. In this case, the ionization device 40 irradiates the gaseous target X2 with the beam X3 through the second conduit 34 to ionize the target included in the gaseous target X2 (S130). Here, the ionization device 40 may be DART, and the beam X3 generated in the ionization device 40 may be a helium beam. By using DART as the ionization device 40, a non-polar low-molecular-weight material, a silicon-based compound, or the like that is difficult to be ionized with another ionization method may be ionized.

In S140, the ionized target is introduced into the mass spectrometer 50 through the third conduit 36, and then mass spectrometry is performed.

Example 1. Non-Polar Low-Molecular-Weight Material

FIG. 5 is a view illustrating a molecular structure of a material according to Example 1.

In Example 1, the material having the molecular structure illustrated in FIG. 5 was analyzed using the liquid chromatography/mass spectrometer according to an exemplary embodiment of the present disclosure. Here, an electric sprayer was used as the droplet sprayer 10, sheath gas was additionally used for effective evaporation of a solvent, and DART radiating a helium beam was used as the ionization device 40. An element composition of the material according to Example 1 was $C_6H_3BrFI$, and an exact mass of the material was 299.8.

FIG. 6 is a mass spectrum of the material according to Example 1 by the liquid chromatography/mass spectrometer according to an exemplary embodiment of the present disclosure.

A mass spectrum of the material according to Example 1 was not obtained using a liquid chromatography/mass spectrometer using APCI as an ionization device according to the related art. However, when the liquid chromatography/mass spectrometer using DART as the ionization device 40 according to an exemplary embodiment of the present disclosure was used, a clean mass spectrum of the material according to Example 1 was obtained (see FIG. 6). Here, a mass-to-charge ratio (m/z) was 316.8.

Examples 2 and 3. Silicon-Based Compound

FIG. 7 is a view illustrating a molecular structure of a material according to Example 2, and FIG. 8 is a view illustrating a molecular structure of a material according to Example 3.

In Examples 2 and 3, the materials having the molecular structures illustrated in FIGS. 7 and 8, respectively, were analyzed using the liquid chromatography/mass spectrometer according to an exemplary embodiment of the present disclosure. Here, an electric sprayer was used as the droplet sprayer 10, sheath gas was additionally used for effective evaporation of a solvent, and DART radiating a helium beam was used as the ionization device 40. An exact mass of the material according to Example 2 was 1,224.1, and an exact mass of the material according to Example 3 was 1,410.2.

FIG. 9 is a mass spectrum of the material according to Example 2 by the liquid chromatography/mass spectrometer according to an exemplary embodiment of the present disclosure, FIG. 10 is a mass spectrum of the material according to Example 2 by a liquid chromatography/mass spectrometer according to the related art, FIG. 11 is a mass spectrum of the material according to Example 3 by the liquid chromatography/mass spectrometer according to an exemplary embodiment of the present disclosure, and FIG. 12 is a mass spectrum of the material according to Example 3 by the liquid chromatography/mass spectrometer according to the related art.

Mass spectra of the materials according to Examples 2 and 3 obtained using the liquid chromatography/mass spectrometer using APCI as an ionization device according to the related art showed peaks at various mass-to-charge ratios (m/z) (see FIGS. 10 and 12). On the other hand, when the liquid chromatography/mass spectrometer using DART as the ionization device 40 according to an exemplary embodiment of the present disclosure was used, clean mass spectra of the materials according to Examples 2 and 3 were obtained (see FIGS. 9 and 11).

As described above, according to an exemplary embodiment of the present disclosure, the interface suitable for application of the direct analysis in real time to the liquid chromatography/mass spectrometer is provided, such that it is possible to effectively detect a non-polar low-molecular-weight material, a silicon-based compound, and the like that are difficult to be detected with LC/MS using another ionization method according to the related art.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. An interface between a liquid chromatography (LC), an ionization device, and a mass spectrometer (MS), wherein a sample containing a target eluted from the liquid chromatography is ionized by the ionization device and the ionized sample is introduced into the mass spectrometer, wherein the interface comprises:

a droplet sprayer;

an evaporator having a heatable block, wherein the heatable block has one or more openings; and an introduction tube, wherein the droplet sprayer is for converting the sample containing the target eluted from the liquid chromatography into sample droplets and for spraying the sample droplets into the evaporator, wherein the evaporator is for evaporating a solvent of the sample droplets to generate a gaseous target by passing the sample droplets through the one or more openings, wherein the introduction tube is for receiving the gaseous target from the evaporator and for introducing an ionized gaseous target into the mass spectrometer, wherein the ionization device ionizes the gaseous target passing through the introduction tube by irradiating the gaseous target in the introduction tube with a beam to form the ionized gaseous target, and wherein a first end of each of the one or more openings facing the droplet sprayer has an inclined surface, and wherein a diameter of the first end decreases along the inclined surface in a direction of flow of the sample droplets.

2. The interface of claim 1, wherein:

a diameter or a length of each of the one or more openings is adjustable.

3. The interface of claim 1, wherein:

the block includes a plurality of pieces, and the plurality of pieces are combined with each other to form the one or more openings.

4. The interface of claim 3, wherein:

the evaporator includes a housing, and the block is detachably mounted in the housing so as to intersect with a flow of the sample droplets.

5. The interface of claim 1, wherein:

a diameter of the first end of the opening is 1 mm to 20 mm, a diameter of a second end of the opening is 0.1 mm to 5 mm, and a length of the opening along the direction of flow of the sample droplets is 0.5 mm to 100 mm.

6. The interface of claim 1, wherein:

the block is capable of being heated to a set temperature of 50° C. to 500° C.

7. The interface of claim 1, wherein:

the ionization device is direct analysis in real time (DART) that radiates a helium beam.

8. A sample analysis method, comprising:

separating a mixture into components and eluting at least one of the components as a sample containing a target and a solvent;

converting the sample into sample droplets and spraying the sample droplets by a droplet sprayer into an evaporator;

evaporating the solvent in the sample droplets in the evaporator to generate a gaseous target;

ionizing the gaseous target by irradiating the gaseous target with a beam produced by an ionization device to form an ionized target; and performing mass spectrometry on the ionized target, wherein the evaporator includes a housing, and a block that is detachably mounted in the housing so as to intersect with a flow of the sample droplets and is heatable to a set temperature, wherein the block includes one or more openings, and the sprayed sample droplets are converted into the gaseous target while passing through the one or more openings, and wherein a first end of each of the one or more openings facing the droplet sprayer has an inclined surface, and wherein a diameter of the first end decreases along the incline surface in a direction of flow of the sample droplets.

9. The sample analysis method of claim 8, wherein:

the gaseous target flows towards a mass spectrometer through an introduction tube, and wherein the ionization device is direction analysis in real time (DART) that irradiates the gaseous target flowing through the introduction tube with a helium beam.

10. The sample analysis method of claim 8, further comprising adjusting a diameter or a length of the opening or the set temperature based on a target.

11. The sample analysis method of claim 8, wherein:

a diameter of the first end of the opening is 1 mm to 20 mm, a diameter of a second end of the opening is 0.1 mm to 5 mm, a length of the opening along a direction of flow of the sample droplets is 0.5 mm to 100 mm, and the set temperature is 50° C. to 500° C.

* * * * *